United States Patent
Levow et al.

(10) Patent No.: US 8,838,965 B2
(45) Date of Patent: Sep. 16, 2014

(54) SECURE REMOTE SUPPORT AUTOMATION PROCESS

(75) Inventors: Zachary Levow, Palo Alto, CA (US); Andrew Konstantinov, San Jose, CA (US)

(73) Assignee: Barracuda Networks, Inc., Campbell, CA (US)

( * ) Notice: Subject to any disclaimer, the term of this patent is extended or adjusted under 35 U.S.C. 154(b) by 1515 days.

(21) Appl. No.: 11/844,348

(22) Filed: Aug. 23, 2007

(65) Prior Publication Data

US 2009/0052675 A1 Feb. 26, 2009

(51) Int. Cl.
*H04L 29/06* (2006.01)
*H04L 9/00* (2006.01)
*G06F 21/33* (2013.01)

(52) U.S. Cl.
CPC ............... *H04L 63/06* (2013.01); *G06F 21/33* (2013.01); *H04L 63/029* (2013.01)
USPC ............................... 713/168; 726/14; 726/27

(58) Field of Classification Search
None
See application file for complete search history.

(56) References Cited

U.S. PATENT DOCUMENTS

| | | | |
|---|---|---|---|
| 6,751,729 B1 * | 6/2004 | Giniger et al. ................ 713/153 |
| 7,059,516 B2 * | 6/2006 | Matsuyama et al. .......... 235/382 |
| 7,827,409 B2 * | 11/2010 | Fascenda ....................... 713/171 |
| 8,386,783 B2 * | 2/2013 | Tanaka et al. ................. 713/171 |
| 2005/0190769 A1 * | 9/2005 | Smith ......................... 370/395.2 |
| 2006/0074618 A1 * | 4/2006 | Miller et al. .................... 703/13 |
| 2006/0090136 A1 * | 4/2006 | Miller et al. .................. 715/734 |
| 2006/0105741 A1 * | 5/2006 | Suh et al. ...................... 455/410 |
| 2006/0197973 A1 * | 9/2006 | Castellani et al. ........... 358/1.14 |
| 2006/0294516 A1 * | 12/2006 | Winner et al. ..................... 718/1 |
| 2007/0157303 A1 * | 7/2007 | Pankratov ....................... 726/11 |
| 2007/0186281 A1 * | 8/2007 | McAlister ....................... 726/14 |
| 2011/0122774 A1 * | 5/2011 | Hassan et al. ................. 370/242 |
| 2013/0262929 A1 * | 10/2013 | Oelsner et al. .................. 714/27 |
| 2014/0075507 A1 * | 3/2014 | Robin et al. ...................... 726/3 |

OTHER PUBLICATIONS

Montengro, "Reverse Tunneling for Mobile IP, revised", Jan. 2001, Network Working Group Request for Comments: RFC 3024, p. 1-30.*

* cited by examiner

*Primary Examiner* — Christopher Revak
(74) *Attorney, Agent, or Firm* — Duane Morris LLP

(57) ABSTRACT

Secure Remote Support Automation Process wherein a remote support server receives a support task request and schedules a predefined task to a predefined actor who also has a predefined escalation policy and notifies the support actor of the scheduled task along with a key, a key seed, or a credential to use in authentication. The method enabling privileged access to an Internet security appliance using public/private key pairs through a firewall and network address translation by a support server and an assigned support task actor.

15 Claims, 6 Drawing Sheets

SECURE REMOTE SUPPORT AUTOMATION PROCESS

REFERENCES

Silverman Richard, Barrett, Daniel; Byrnes, Robert SSH, The Secure Shell: Definitive Guide O'Reilly Media Inc, May 2005

Weise, Joel, Public Key Infrastructure- Overview Sun Blueprints Online Sun Microsystems August 2001

Carlisle Adams, Understanding Public-key Infrastructure, Macmillan Technical Publishing, November 1999

Tom Austin, PKI-A Wiley Tech Brief, Wiley, John & Sons Inc, December 2000

Arto Salomaa Public-Key Cryptography, Springer-Verlag, Berlin, Heidelberg, 1990

Bruce Schneier, Applied Cryptography, Wiley, John & Sons, Inc. October 1995

Alfred Menezes, Handbook of Applied Cryptography, CRC Press LLC October 1996

PKI Practices and Policy Framework Draft AXSI X9.79 standard

Russell Housley, Internet Public Key Infrastructure, X509 Credentials and CRL Profile RFC 2459, 1999

BACKGROUND

In conventional system administration of a computer system, an all powerful system administrator authenticates using a password at a console and issues commands and edits files to create other users, establish their access rights, and perform maintenance. Some utilities can be permitted by such a system administrator to allow remote access. Little or no record is kept of changes and the "superuser" can remove or modify any records.

Historically, to establish security of computer systems the first step is physical and network isolation. Users must have passwords and there are ways to make passwords "stronger" by following certain rules.

Security policies which may encourage stronger passwords include the following: enforcing a minimum length of the password; allowing a maximum time for a password before it is changed; checking a password against a dictionary so that no words can be found that are normal language words; requiring that a password be composed of a mix of numbers and letters; requiring that the user mix upper and lower case text; and hashing a user selected password into a pseudorandom password of longer length.

Administrators of systems may take certain actions to protect their systems such as denying the ability to remotely log into a system from other than the console. Users may be defined to have a limited number of commands available to them or have certain access control levels set for directories and subdirectories. Rather than defining the commands and access controls for each user, users may be assigned to profiles and the profiles defined ahead of time for certain access to files or commands.

Between two computer systems there are a number of ways of controlling access. One way is to define one computer system as the client of another which is considered to be a server. A secure socket layer protocol can provide some confidentiality in identifying the server and encrypting the traffic between the client and the server. Web browsers on the clients and Web servers on the server can support a secure socket layer protocol but the forms or pages must be defined to take advantage of SSL.

Even stronger security is provided through some two-part authentication method. This could be a physical key such as a flash drive or a fingerprint reader and a password. More convenient is the use of a public key associated with a private key. By storing a public-key in a directory at a server and a private key with a client, a secure shell SSH can provide a tunnel through a firewall.

Definition List 1

| Term | Definition |
|---|---|
| Strong passwords | For a password to be strong, it should: Be long. Because of the way passwords are encrypted, the most secure passwords are seven or 14 characters long. Contain characters from each of the following groups: 1. Letters (uppercase and lowercase) 2. Numerals 3. Symbols (all characters not defined as letters or numerals) Be significantly different from prior passwords. Not contain a user name. Not be a common word or name. Passwords can be the weakest link in a computer security scheme. Strong passwords are important because password cracking tools continue to improve and the computers used to crack passwords are more powerful than ever. Network passwords that once took weeks to crack can now be cracked in hours. Password cracking software uses one of three approaches: intelligent guessing, dictionary attacks, and automation that tries every possible combination of characters. Given enough time, the automated method can crack any password. However, it still can take months to crack a strong password. |
| rlogin | rlogin is a utility that allows users to log in via a network. Logged-in users can act as if they were physically present at the computer. rlogin is most commonly deployed on networks where user account information is shared. rlogin has a serious security problem: All information, including passwords, is transmitted unencrypted (making it vulnerable to interception). |
| Superuser | The super user with unrestricted access to all system resources and files is the user named root. This user has supreme privileges and may add new users. |
| Sudo | The sudo utility allows users defined in a configuration file to have temporary access to run commands they would not normally be able to due to file permission restrictions. |
| SSL | Secure Sockets Layer, is a protocol developed by for transmitting private documents. SSL uses a cryptographic system that uses two keys to encrypt data —a public key known to everyone and a private or secret key known only to the recipient of the message. Many Web sites use the protocol to obtain confidential user information. |
| http | Hypertext Transfer Protocol (HTTP) is a communications protocol used to transfer or convey information. Its original purpose was to provide a way to publish and retrieve HTML hypertext pages. HTTP is a request/response protocol between clients and servers. |
| SSH | Secure Shell or SSH is a network protocol that allows data to be exchanged over a secure channel between two computers. Encryption provides confidentiality and integrity of data. SSH uses public-key cryptography to authenticate the remote computer and allow |

Definition List 1

| Term | Definition |
| --- | --- |
| | the remote computer to authenticate the user, if necessary. SSH is typically used to log into a remote machine and execute commands, but it also supports tunneling, forwarding arbitrary ports and connections; it can transfer files. |
| Firewall | A firewall is a hardware or software device which is configured to permit, deny, or proxy data through a computer network which has different levels of trust. A firewall's basic task is to transfer traffic between computer networks of different trust levels. |
| NAT | Network Address Translation (NAT, also known as Network Masquerading, Native Address Translation or IP Masquerading) involves rewriting the source and/or destination addresses of IP packets as they pass through a Router or firewall. Most systems using NAT do so in order to enable multiple hosts on a private network to access the Internet using a single public IP address. Since NAT depends on a machine on the local network to initiate any connection to hosts on the other side of the router, and prevents malicious activity initiated by outside hosts from reaching those local hosts it is a barrier to remote support. |
| SSH-R port:host:hostport | Specifies that the given port on the remote (server) host is to be forwarded to the given host and port on the local side. Whenever a connection is made to this port, the connection is forwarded over the secure channel, and a connection is made to host port hostport from the local machine. |
| Unix domain socket | A socket is a communication mechanism. Unix domain socket (UDS) or IPC socket (inter-process communication socket) is a virtual socket, similar to an internet socket that is used for inter-process communication. |
| Appliance | A computer software device which provides a narrow range of functions that are generally run with limited user interface and packages together application and operating system capabilities. Embodiments of an appliance include an applications specific integrated circuit with some basic configuration by a user and deeper privileged programming by the manufacturer. Another embodiment is a general purpose computer with a new operating system that integrates an application into the operating system. Another embodiment is a software appliance with conventional hardware and operating system but where the user cannot access anything but the application interface and where the underlying architecture is essentially invisible. Another embodiment is a virtual appliance or virtual software appliance using a software stack within a computer adapted to operate as a number of virtual machines. Typically a virtual appliance will have a limited user interface to configure the inner workings of the appliance which is built to host a single application. |

Current challenges—A solution for the explosive growth of Internet connected devices which stresses the Internet protocol address space is to provide an apparatus or means for network address translation at the intersection of local area networks with the Internet. This alone hides the actual IP address of Internet connected devices. Also for protection against malicious users and software, local area networks are protected by firewalls which are either apparatus or methods tangibly embodied as programs running on a computer.

As the number of users grow in every locality there is a need for global installation of Internet infrastructure. In many cases this infrastructure is installed in locations where there are not highly skilled system and network administrators. Furthermore the operations of systems on the Internet frequently span the local workday and require 24×7 support most conveniently provided from several time zones remote to the installation of an Internet appliance.

Economically it is also efficient to outsource the maintenance of Internet connected devices to specialists at distant locations. This role may be distributed among software or hardware vendors their added value added resellers and to their distribution channel partners. One or more of these may provide different levels of support and maintenance. However it always remains the responsibility of the owner of the Internet connected device to control his asset. Over time the business relationships and locations of support organizations may change for economic reasons or for strategic reasons.

Remote support is most likely to be provided not only by non-employees of the owner but even subcontractors of the vendor the owner has chosen to do business with and whose contracts may expire. Therefore users who are authorized to have access to an Internet appliance during one contract may change in another.

It is important when dealing with distant parties who are providing an arms length service that there be provisions for logging their activity and recovering from errors or malicious changes. Because there are three or more parties involved and the opportunity for a diluted responsibility it is desirable to use some concepts of process automation to efficiently ensure that services are provided in a timely manner and maintain traceability of action or inaction.

Thus it can be appreciated that what is needed is a way to improve security and simplicity in connecting a remote support technician to an Internet appliance which is protected behind a firewall or network address translation means in addition to physical inaccessibility. Improved security would mean positive identification of each end of the connection, multiple levels of privileged access, a record of the changes, and limited time period for the access. Simplicity would be measured in the number of actions that the appliance owner needs to understand and execute to remain in control of his asset.

SUMMARY OF THE INVENTION

In an embodiment of the present invention, a secure remote support automation process, the operator of an internet appliance does not require a high level of administration skills and simply initiates a support task request. Such a support task request may be scheduled regularly by calendar or on demand that is ad hoc by pressing a real or virtual button using a display—keyboard as standard input.

A remote support server receives a support task request and schedules a predefined task to a predefined actor who also has a predefined escalation policy and notifies the support actor of the scheduled task along with a key, a key seed, or a credential to use as an authentication credential.

A remote support actor located at a support center receives notification of a scheduled remote support task, authentication credentials, and contacts the internet appliance in some way to respond. This is perhaps by telephone for a verbal interaction or more usefully by at least one encrypted electronic channel through the remote support server, presenting an authentication credential and using the allowed access rights to read and copy certain files and issue certain commands.

The remote support server connects the remote support actor to the internet appliance, validates authentication credentials, tracks and logs activity, updates the task scheduler and in the event that allow time for support expires without closure, escalates the task assignment according to policy to a designated secondary support actor, reporting on the status of all remote support requests accordingly.

In brief, the method of operating an internet appliance includes initiating a remote support request which includes generating a key seed or a public/private key pair, authenticating the support actor using the public/private key pair, and enabling a predefined level of privileged access to issue commands, read files, and edit them.

The method of operating a remote support service includes receiving a remote support request, receiving a key seed or a public key or a private key or a digital credential authorizing a certain level of privileged access to a certain internet appliance, assigning and notifying a support actor of the scheduled support task, opening a channel and validating authentication credentials, logging support activity and escalating the task according to a policy if the task is not started within a window of time.

The method of operating a remote support center is to receive the assignment of a scheduled support task, obtain the authentication credentials, connect via the support server to the internet appliance, and perform requested support services within the allowed window of time.

The illustration of the best mode above includes steps which those skilled in the art understand to convey a flavor of the value added to the invention itself which is strictly disclosed in the claims following.

The present invention is a method for operating a support server coupled to an Internet appliance through a firewall using a electronic communications medium such as the Internet.

An Internet appliance is coupled, through a firewall or other apparatus providing network address translation to the Internet. A support server is coupled to the Internet. The Internet provides electronic communication through standard protocols. The method of the invention is to first create a public/private key pair and store it on the support server through a first means and to use a second means to authenticate and carry a secure connection between the support server and the Internet appliance. The invention further comprises using a key seed to generate a public/private key pair for a particular service request which may be limited in time, number of accesses, or level of privilege, transmitting the key seed or the public key through a low security protocol such as http, and using a second protocol such as SSH to reverse tunnel from the support server to the Internet appliance.

DETAILED DESCRIPTION

Figure 1:
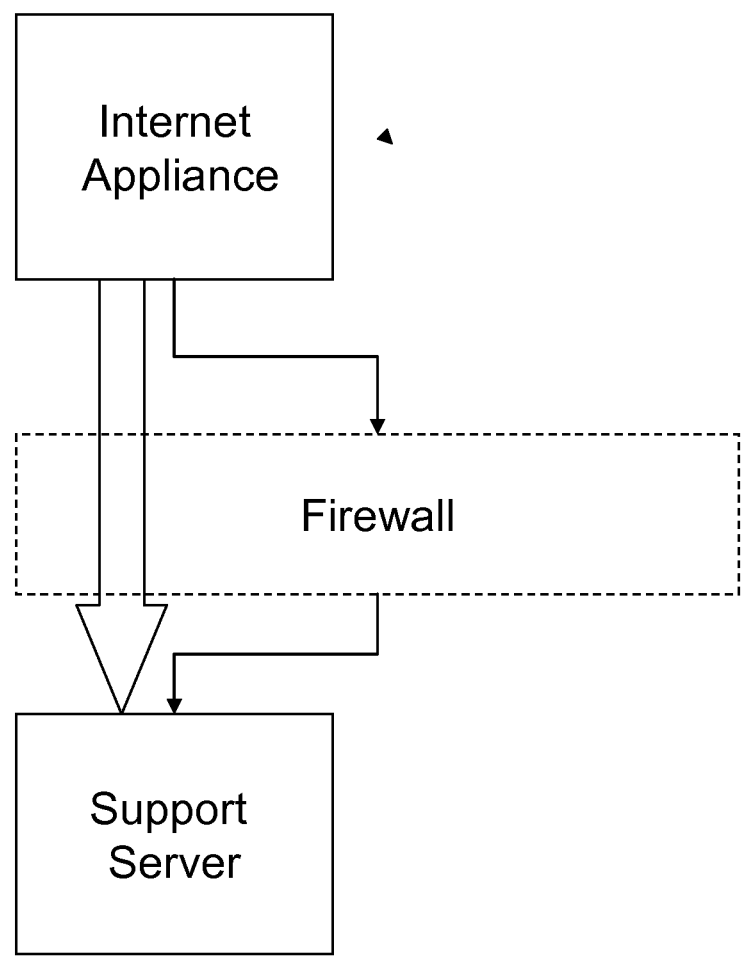
FIG. 1 Block Diagram of Appliance Connecting Thru Firewall to Server
FIG. 2 Block Diagram of Appliance Connecting to Support Center
FIG. 3 Block Diagram of Plurality of Support Centers
FIG. 4 Flow Chart of Appliance Method
FIG. 5 Flow Chart of Server Method
FIG. 6 Flow Chart of Support Center Method
Figure 2:
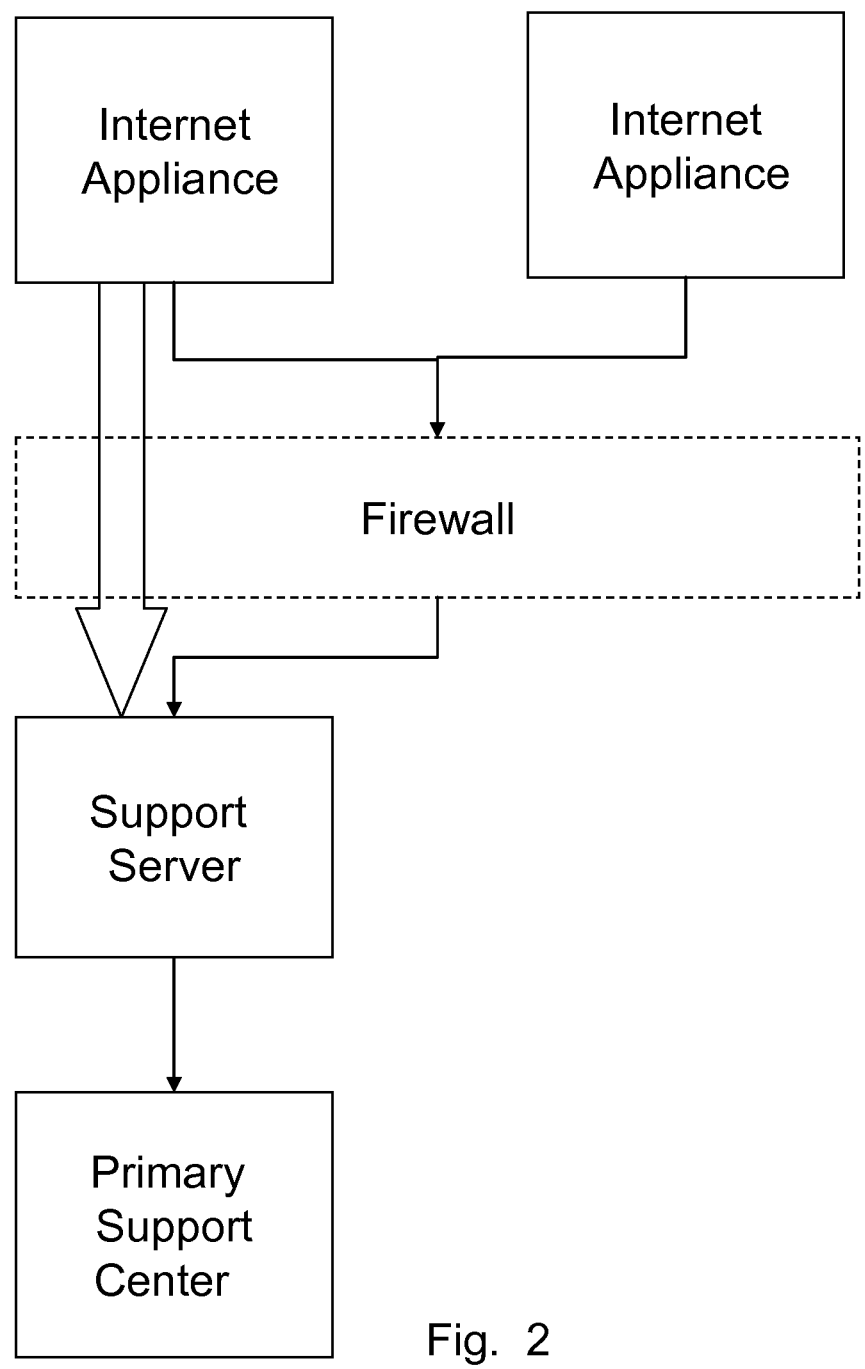
Figure 3:
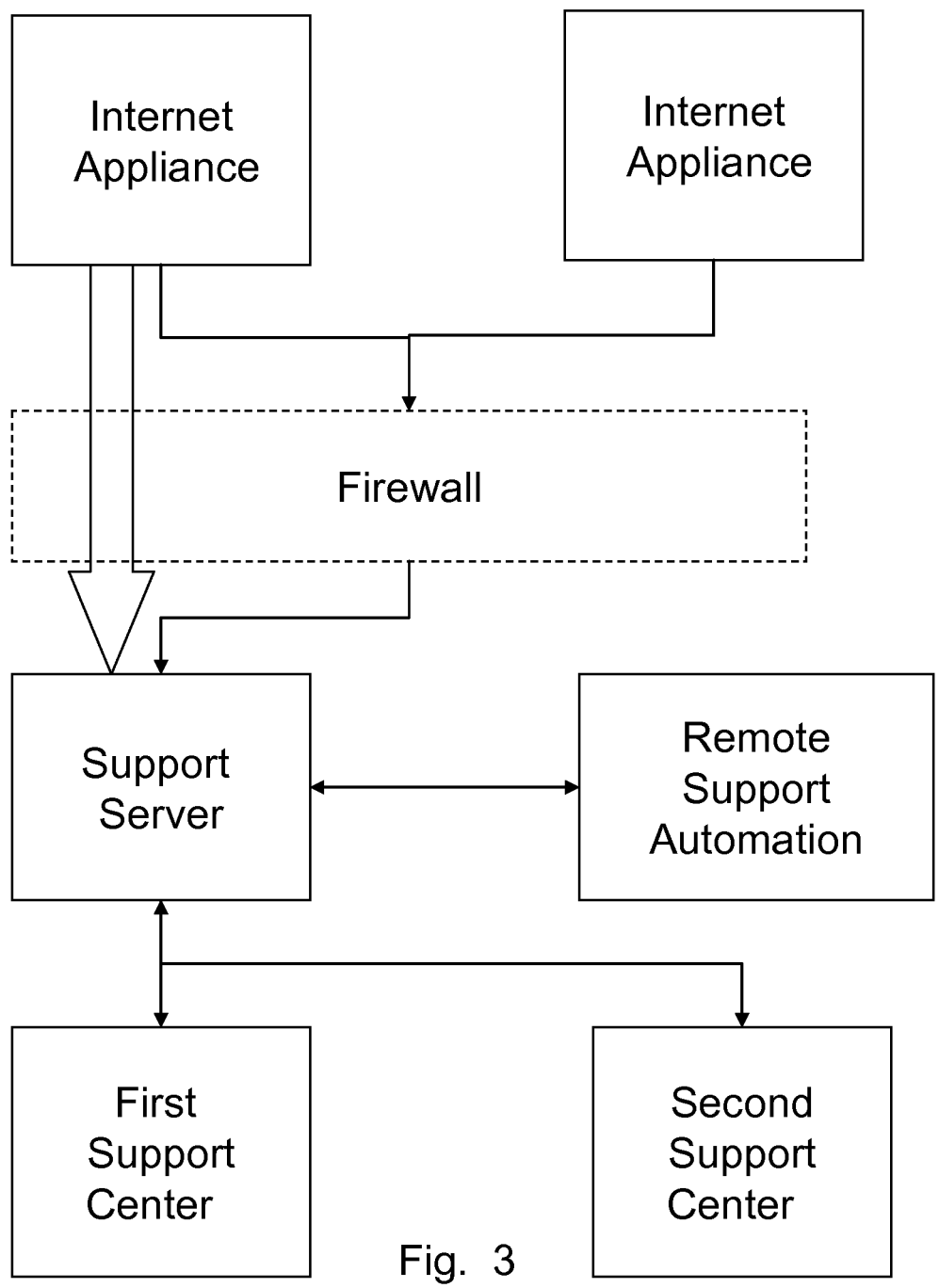
Figure 4:
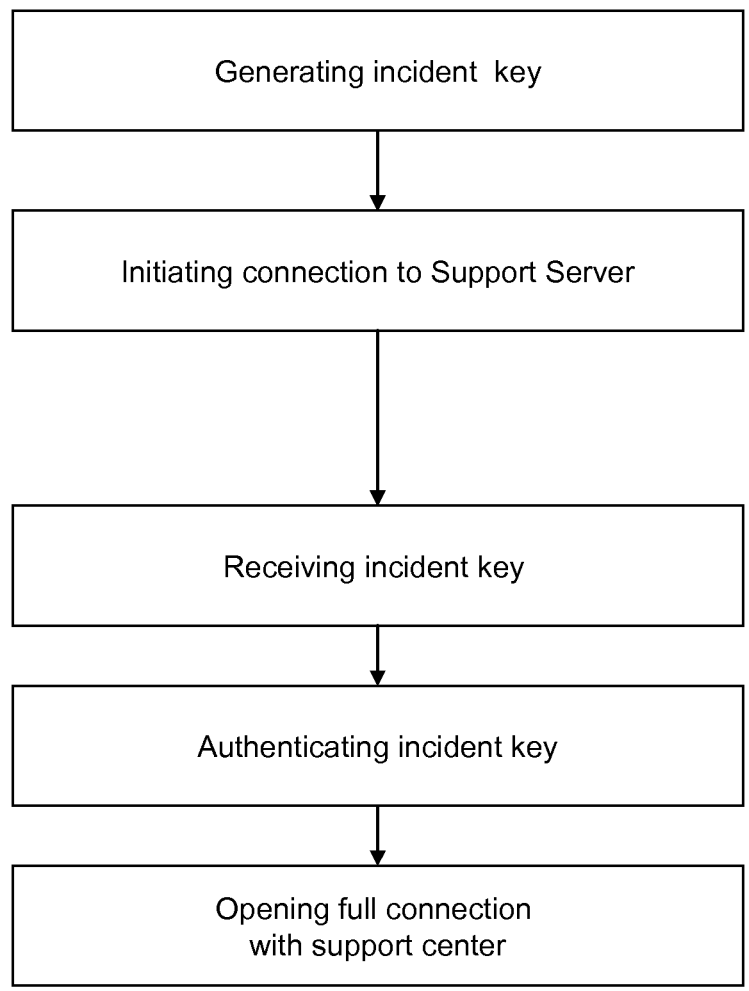
Figure 5:
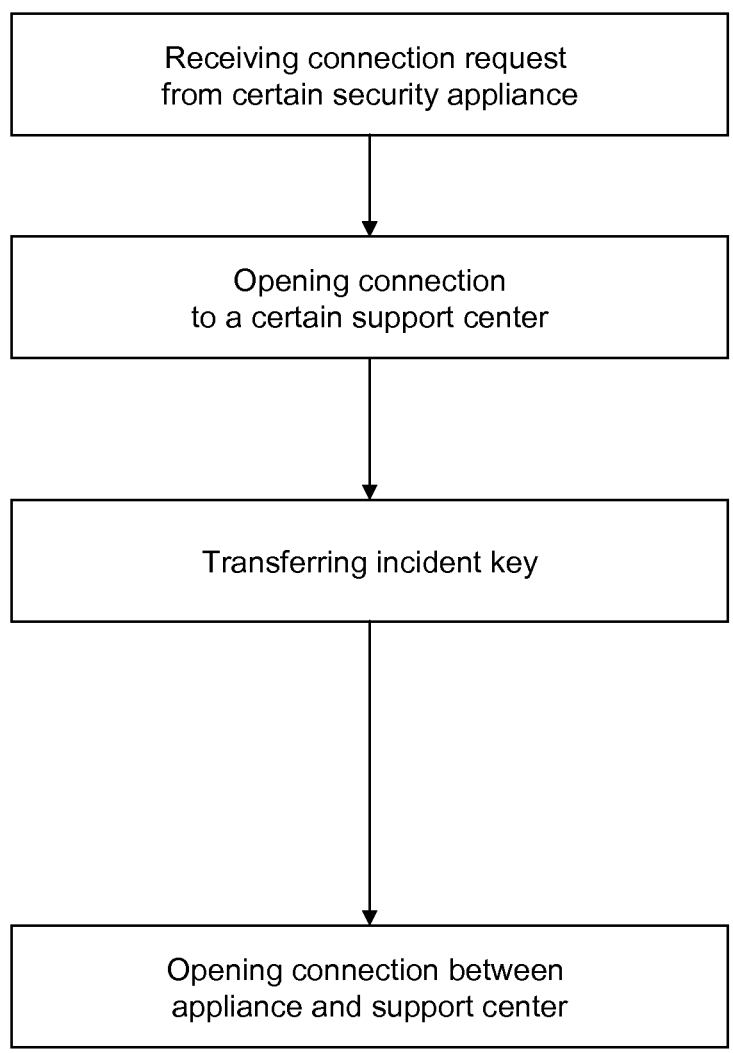
Figure 6:
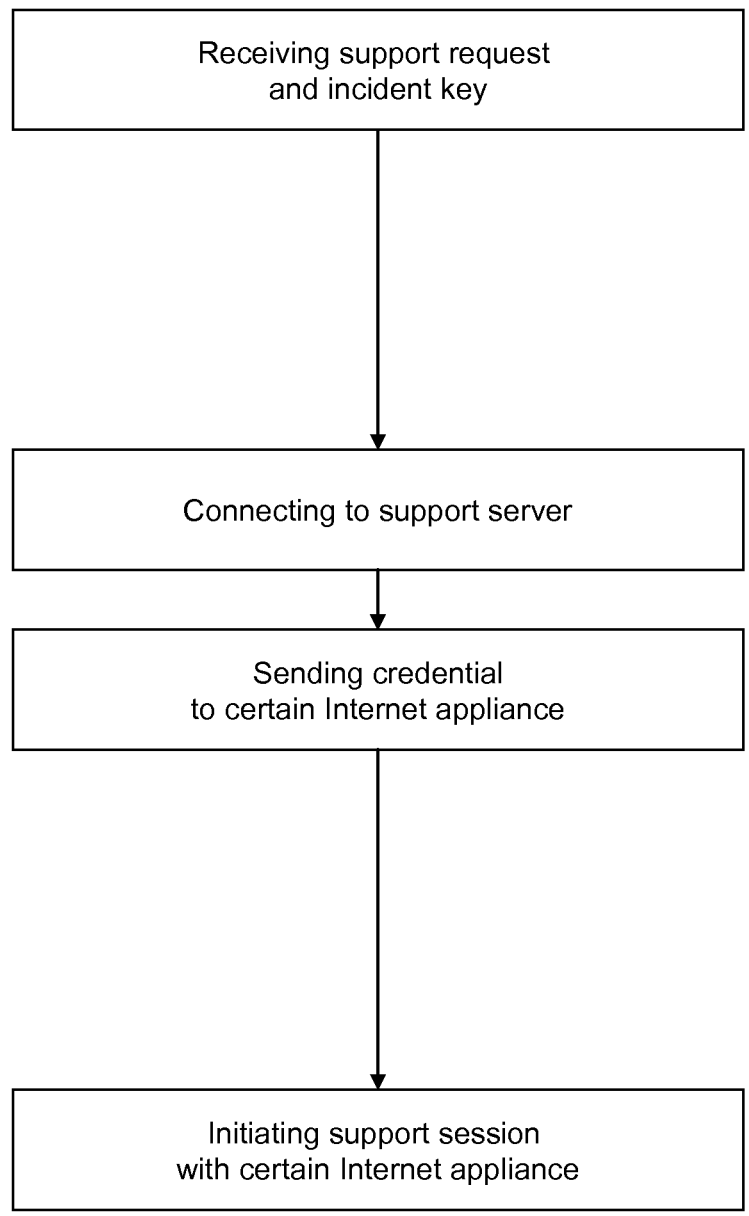

An embodiment of the present invention comprises generating a public/private key pair, storing a public key on a server, storing a private key on an Internet appliance, reverse tunneling through a firewall on a secure channel with the public/private key pair and authenticating as a privileged user conventionally.

An embodiment of the present invention comprises creating a key seed, generating a public/private key pair, storing a public key and a private key on a server, storing a public key and a private key on an Internet appliance, tunneling through a firewall on a secure channel with the public/private key pair and reverse tunneling through the firewall on a secure channel with the public/private key pair.

An embodiment of the present invention comprises creating at least one key seed, generating a plurality of public/private key pairs, storing a public key and a private key on a server, storing a public key and a private key on an Internet appliance, tunneling through a firewall on a secure channel with one public/private key pair and reverse tunneling through the firewall on a secure channel with a second public/private key pair.

The invention further comprises the steps of sending a public key from the Internet appliance and receiving the public key on the server by using the POST method of the HTTP or HTTPS protocol and storing the public key and the identity of the originating Internet appliance in the file naming authorized users of the server.

The invention further comprises the step of sending a key seed from the Internet appliance and receiving the key seed on the server and generating a public/private key pair on the appliance and generating the public/private key pair on the server by operating on the key seed in both methods.

The invention further comprises generating an incident specific ad hoc public/private key pair with a certain security profile or allowed level of privileged access, transmitting the private key to a remote support organization, storing the public key on an Internet appliance, and removing the public key after a period of time whereby privileged access is restricted in time, and to allowed services to a specific remote support organization.

The invention further comprises generating an intermittently updated persistent public/private key pair with service limited to signaling a need for service, transmitting the public key to a remote support organization, storing the private key on an Internet appliance and creating a reverse tunnel from the Internet appliance to the support server using the public/private key pair.

The invention includes using http protocol to transfer at least one of the following to the support server: a key seed, a public key, and a private key.

The invention includes generating a public/private key pair from a key seed on the support server and on the Internet appliance having a restricted level of privileged access.

The invention includes removing the public/private key pair generated from a key seed after a certain amount of time to prevent continuing access.

The invention includes applying a pseudo-random algorithm to produce a key seed whereby a key seed is less guessable and less likely to be repeated.

The present invention is a system comprising a support server coupled to the Internet, a local support client coupled to the Internet, an Internet appliance coupled to a firewall, the firewall coupled to the Internet and a method for operating any part of the system.

The method for operating a support center comprises the steps following:
  receiving a key seed relating to a certain support request on a certain Internet appliance;
  connecting to a support server;

obtaining a public/private key pair for limited privileged access on the Internet appliance; and presenting an authentication credential to access the Internet appliance and provide maintenance.

The method for operating an Internet appliance comprises the following steps:

selecting a key seed;

transmitting a key seed to a local support client;

generating at least one public/private key pair from the key seed and a support role profile;

initiating a reverse tunnel through a firewall using a public/private key pair; and authenticating a credential presented for remote access.

The method for operating an Internet appliance may use a single public/private key pair for initiating a reverse tunnel as well as authenticating a remote support login.

The method for operating an Internet appliance may use a plurality of public/private key pairs for initiating a reverse tunnel and for authenticating remote support login by various support roles.

Selecting a key seed at the Internet appliance may be done manually or by using a pseudo-random key seed generator which will avoid repetition and easily guessed key seeds.

In an embodiment, the method for operating an Internet appliance has the additional step of transmitting a public key to the server before initiating a reverse tunnel using HTTP or HTTPS protocol to transmit the public key and using SSH protocol to initiate the reverse tunnel.

The method of operating a support server comprises the steps following: storing a public key in computer readable media, receiving a reverse tunneling service request from an Internet appliance, authenticating the reverse tunneling connection by using the public key, authenticating a support technician, and channeling standard input and output between the support technician and the Internet appliance.

The method further comprises the step of: receiving a public key by serving an http or https method from an Internet appliance whereby the public key may be occasionally or sporadically updated at the initiative of the Internet appliance owner.

The method further comprises the step of: storing a first public/private key pair and a second public/private key pair.

The method further comprises the step of: receiving a key seed wherein a key seed has been chosen or pseudo-randomly generated at an Internet appliance; generating a public/private key pair from the key seed wherein the key seed specifies an access profile limiting the capability of a user; and storing a private key for a certain support technician;

The method further comprises the step of: connecting to a certain Internet appliance as a certain support technician; and responding to an authentication request from the Internet appliance by using the private key. The method further comprises using a socket directed to the file system instead of conventional ports to connect between the support server and the Internet appliance. Instead of conventionally specifying a port number, the present invention specifies a filename for a unix domain socket to both SSH client and SSH daemon. An embodiment of the present invention is ssh -T -o StrictHostKeyChecking=no -i/home/emailswitch/code/config/id_rsa -o
-R[/var/tunnels/ssh/31676.sock]:127.0.0.1:22
-R[/var/tunnels/www/31676.sock]:127.0.0.1:8000 instead of conventionally specifying a port number, the present invention further comprises specifying a filename for the unix domain socket whereby a limitation in number of connections is overcome.

The method further comprises the step of: logging all standard input and output between the support technician and the Internet appliance.

The method further comprises the step of: removing the private key after a certain period of time from receipt of the key seed.

A method of operating a support server includes the following steps:

storing a first public/private key pair and a second public/private key pair;

authenticating a certain support technician;

receiving a key seed wherein a key seed has been chosen or pseudo-randomly generated at an Internet appliance;

generating a public/private key pair from the key seed wherein the key seed specifies an access profile limiting the capability of a user;

storing a private key for a certain support technician;

receiving a public key, storing the public key in computer readable media, receiving a reverse tunneling service request from an Internet appliance, authenticating the reverse tunneling connection by using the public key;

connecting to a certain Internet appliance as a certain support technician;

responding to an authentication request from the Internet appliance by using the private key; logging all standard input and output between the support technician and the Internet appliance; and removing the private key after a certain period of time from receipt of the key seed.

The method of operating a support server further comprises generating a plurality of public/private key pairs by recursively hashing the key seed and using each of the plurality of public/private key pairs only once.

The present invention may be practiced by using only one public/private key pair and two connections wherein a public key is received by the server on one connection such as http or https; and a private key is used to authenticate the second connection such as ssh. Conventional means of privileged access is protected by the second connection.

The present invention may be practiced by using a key seed and generating the public/private key pair at both the server and the Internet appliance. The public key is used by the server to authenticate a connection request from the Internet appliance and the private key is used by the server to authenticate the privileged access by the support technician. The invention further comprises methods of protecting access by having an expiration date or number of uses or level of access associated with a key seed.

The present invention may be practiced by using two public/private key pairs wherein the server uses a first public key to authenticate a connection initiated from the Internet appliance, and subsequently uses a second private key to authenticate a support technician to the Internet appliance. It can be appreciated by those skilled in the art that the set of commands available to be accepted and copying and editing of files may be controlled using each of these public/private key pairs.

The present invention may be practiced by having two independent means of transferring a public key, a private key, or a key seed. Embodiments of the means of transferring part or all of a public/private key pair or a key seed follow as illustrations but not limitations of the invention: http protocol, secure http protocol, secure socket layer protocol, ftp protocol, secure ftp protocol, encrypted email, password protected files, a socket, a telephone conversation, an encrypted voip link, an encrypted chat link, a message in a bottle, and physical delivery of a computer readable electronic medium such as a flash drive, An embodiment of a method for process automation of remote support illustrates the present invention without restricting its scope in the following steps:
1. Assigning a barracuda central support account manager to a set of disti-var local support centers.
2. Assigning a barracuda central support account escalation manager to each account manager.
3. Dispatching an open ticket to a disti-var local support center upon receipt of the http: POST or https: POST.
4. Displaying on a console the number of open tickets for each disti-var and time-stamp of the closing of each ticket or connection of disti-var local support to the barracuda.
5. Escalating an open ticket to the barracuda central support account manager if the open ticket remains open for >h hours and measuring disti-vars on their responsiveness.

Conclusion

The present invention is a system for secure remote support of an Internet appliance comprising an appliance coupled to electronic communications media, a support server coupled to the electronics communications media and a method tangibly embodied as program product executable instructions encoded on computer readable media adapted to control the operation of the appliance and the server whereby owners of an Internet appliance behind a firewall may grant privileged access to support technicians operating a support server distant from the site of the appliance. Support includes but is not restricted to monitoring, maintaining, and managing resources of an appliance by manual or automated steps such as installing, upgrading, changing configuration, troubleshooting, repairing, and displaying metrics of system resources.

A method for controlling the operation of a support server has the steps of
  o accepting a public key on a first connection with an internet appliance;
  storing the public key to the authorized user directory in computer readable media;
  starting a second connection; and
  authenticating the Internet appliance on the second connection.

To control the operation of an Internet appliance, the invention takes the steps of generating public/private key pair; transferring the public key on a first connection; initiating a reverse tunnel on a second connection; and authenticating a support credential.

In an embodiment, transferring the public key is done by establishing an http or https protocol session with a server and executing a post operation to electronically communicate a public key to a server. Initiating a reverse tunnel on a second connection comprises establishing an SSH -R session with a server whereby a reverse tunnel through a firewall may be opened. Then the internet appliance receives an SSH client request and authenticates a remote user by checking a second digital credential. More steps include selecting a key seed, transmitting the key seed, generating at least one public/private key pair from the key seed, and storing the public/private key pair on computer readable media. In an embodiment, a pseudo-random key seed generator is used.

A system is disclosed for secure remote support of an Internet appliance comprising an appliance coupled to electronic communications media, a support server coupled to the electronics communications media, a support center and a method tangibly embodied as program product executable instructions encoded on computer readable media adapted to control the operation of the appliance, the server, and the center whereby owners of an Internet appliance behind a firewall may grant privileged access to third party support technicians remotely coupled to a support server distant from the site of the appliance.

A method is disclosed for controlling the operation of a support center coupled to electronic communications media comprising the steps of receiving a key seed; connecting to a support server; obtaining a credential; and presenting the credential for privileged access. Credentials may be used to control multilevel access.

A method for secure remote support of an Internet appliance is disclosed having the steps of creating a public/private key pair; distributing a public key to a support server; establishing a reverse tunnel through a firewall; and verifying a support credential. Other steps include generating a key seed and transmitting a key seed to a support technician, creating and storing a plurality of credentials according to the privilege profile allowed to certain support technicians. In an embodiment a first connection comprises an http protocol POST operation whereby a key seed or a public key may be communicated to a server and a second connection comprises starting an SSH daemon adapted to enable reverse tunneling upon authentication.

A method is disclosed for a support server to protect an Internet appliance by firstly accepting a public key and storing it to a file of authorized users secondly establishing a secure connection upon the request of the Internet appliance, and enabling reverse tunneling across a firewall to perform at least one privileged maintenance and administrative operation. The method further comprises establishing a secure connection with a first support center, and communicating a unique and time sensitive credential from the support center to the Internet appliance. A credential may be a key seed, a public key or a private key.

However as there may be methods equivalent to the steps enumerated, the scope of the invention should be determined by the appended claims and their legal equivalents, rather than the examples given to provide illustrations of presently preferred embodiments.

What is claimed is:

1. A method for controlling the operation of an Internet appliance comprising:
  generating a first public/private key pair comprising a public key and a private key;
  transferring the public key of the first public/private key pair on a first connection with a support server;
  initiating a reverse tunnel through a firewall on a second connection by requesting an SSH-R session;
  establishing an https protocol session through a firewall with said support server; and
  executing a post operation to electronically communicate a public key to said support server and the method further comprises:
  hashing a first key seed to produce a second key seed;
  wherein the key seed enables access for a certain time from generation, and selected command and access privileges;
  transmitting one of the key seeds;
  generating a second public/private key pair; and
  authenticating a user by the second public/private key pair.

2. The method of claim 1 wherein said first connection comprises at least one of an http protocol POST operation and an https protocol POST operation; whereby a key seed or a public key may be communicated to said support server.

3. The method of claim 2 for secure remote support wherein said second connection comprises an SSH-R reverse tunnel upon authentication and redirecting via at least one of:
- a socket on the file system; and
- a Unix domain socket.

4. The method of claim 1 wherein said Internet appliance comprises a virtual software appliance controlling a software stack within a computer adapted to operate as a plurality of virtual machines whereby an appliance may be installed as a plug and play apparatus, an installable software product, or a downloadable module.

5. The method of claim 1 wherein said Internet appliance comprises a conventional computer and operating system but adapted to certain operation whereby the user cannot access anything but the application interface and where the underlying architecture is essentially invisible.

6. The method of claim 1 wherein said Internet appliance comprises a general purpose computer with a new operating system that integrates an application into the operating system adapted to certain operation whereby the user cannot access anything but the application interface and where the underlying architecture is essentially invisible.

7. The method of claim 1 wherein said Internet appliance comprises an applications specific integrated circuit with some basic configuration by a user and deeper privileged programming by the manufacturer whereby the user cannot access anything but the application interface and where the underlying architecture is essentially invisible.

8. The method of claim 1 wherein said an Internet appliance comprises a processor configured by computer software which provides a narrow range of functions that are generally run with limited user interface and packages together application and operating system capabilities adapted to certain operation whereby the user cannot access anything but the application interface and where the underlying architecture is essentially invisible.

9. The method of claim 1 further comprising monitoring, maintaining, and managing resources of said Internet appliance by:
- displaying metrics of system resources, and
- changing configurations of system resources.

10. The method of claim 1 further comprising monitoring, maintaining, and managing resources of said Internet appliance by:
- installing, and
- upgrading system resources.

11. The method of claim 1 further comprising monitoring, maintaining, and managing resources of said Internet appliance by:
- troubleshooting, and
- repairing system resources.

12. A method for operation of a secure support server communicatively coupled to a remote Internet Appliance comprising within the support server:
- providing at least a first secure connection and a second secure connection by operating an https server application, and by operating an SSH server daemon;
- receiving a first secure connection request from the https client at the Internet appliance;
- receiving a public key of a first public/private key pair generated by the Internet Appliance as an https POST transaction;
- receiving a second secure connection request from an SSH client; authenticating that the SSH client is the Internet Appliance by using the first public/private key pair;
- receiving a first seed associated with permitted user privilege, user access, and a time window uploaded through the second secure connection from the Internet Appliance; and
- receiving an SSH-R reverse tunnel command from the Internet Appliance and opening a reverse tunnel also authenticated by the first public/private key pair, whereby commands may be sent from the secure support server to execute on the Internet Appliance.

13. The method for operation of a secure support server of claim 12 further comprising:
- hashing the first seed to create a second seed, generating a second public/private key pair from the second seed,
- filtering commands and data transfers initiated by a user by the permitted user privilege, user access, and time window;
- relaying the filtered user initiated commands and data transfers to the Internet Appliance after authentication of the user by the second public/private key pair generated from the second seed; and
- logging the authentication, the commands, and the data transfers.

14. A method for operation of an Internet appliance communicatively coupled to a remote secure support server comprising, within the Internet appliance:
- generating at least a first public/private key pair and a second public/private key pair;
- initiating a first secure connection as a HTTPS client to the remote secure support server providing an https service;
- uploading a public key of the first public/private key pair to the remote secure support server through an https POST operation, wherein generating said second public/private key pair comprises hashing a first seed to create a second seed; and generating a second public/private key pair from the second seed;
- initiating a second secure connection as an SSH client to the remote secure support server providing an SSH server daemon;
- authenticating the second secure connection by using the first public/private key pair;
- uploading a first seed associated with permitted user privilege, user access, and a time window through the second secure connection;
- transmitting an SSH-R reverse command through the second secure connection to the remote support server whereby a reverse tunnel is created; and
- authenticating the reverse tunnel by using the first public/private key pair.

15. The method for operation of an Internet appliance of claim 14 further comprising:
- receiving a user login via the reverse tunnel between the Internet Appliance and the remote secure support server;
- authenticating the user login by the second public/private key pair, and
- executing only user commands and data transfers which have been filtered and logged at the remote secure support server.

* * * * *